United States Patent [19]
Yamashita

[11] Patent Number: 5,839,544
[45] Date of Patent: Nov. 24, 1998

[54] BRAKE LEVER HAVING A RAPID BRAKE SHOE CLEARANCE ADJUSTING MECHANISM

[75] Inventor: Kazuhisa Yamashita, Sakai, Japan

[73] Assignee: Shimano Inc., Sakai, Japan

[21] Appl. No.: 858,710

[22] Filed: May 19, 1997

[51] Int. Cl.⁶ ................................ G05G 9/00; G05G 7/00
[52] U.S. Cl. ........................ 188/24.9; 188/24.22
[58] Field of Search .................... 188/24.18, 24.19, 188/24.22, 24.11, 24.12; 74/489

[56] References Cited

U.S. PATENT DOCUMENTS

| | | | |
|---|---|---|---|
| 3,997,030 | 12/1976 | Yoshigai | 188/24.19 |
| 4,304,146 | 12/1981 | Ueda . | |
| 4,318,307 | 3/1982 | Kine . | |
| 4,348,916 | 9/1982 | Shimano . | |
| 4,611,500 | 9/1986 | Nagano . | |
| 4,850,241 | 7/1989 | Buckley et al. | 188/24.18 |

FOREIGN PATENT DOCUMENTS

| | | | |
|---|---|---|---|
| 94 15 887.8 | 2/1995 | Germany | 182/24.12 |

*Primary Examiner*—Matthew C. Graham
*Attorney, Agent, or Firm*—Shinjyu An Intellectual Property Firm

[57] ABSTRACT

The invention relates to a brake actuation mechanism having first and second adjusting mechanism. The first adjusting mechanism includes a cam member that engages a portion of a lever member. The cam member includes a plurality of cam surfaces. Each of the cam surfaces is configured such that, when engaged with the lever member, defines a different brake disengagement position for the lever member. Each brake disengagement position corresponds to a corresponding position of brake shoes.

12 Claims, 9 Drawing Sheets

BRAKE LEVER HAVING A RAPID BRAKE SHOE CLEARANCE ADJUSTING MECHANISM

BACKGROUND OF THE INVENTION

A. Field of the Invention

The invention relates to a brake lever arm having an adjusting mechanism which allows for rapid adjustment by a bicyclist of the position of brake shoes with respect to a bicycle tire rim.

B. Description of the Related Art

At one time, brake actuating mechanisms for bicycles were merely levers coupled to the handle bar of a bicycle with a cable connected to the lever, the opposite end of the cable being connected to a brake mechanism adjacent to one of the bicycle wheels. However, brake mechanisms and brake actuating mechanisms have become very sophisticated in recent years.

Brake actuating mechanisms usually include a lever arm mounted to a base member for pivotal movement. The base member is typically mounted to a handlebar of a bicycle. A cable extends from the brake mechanism to the lever arm. The lever arm pivots between a brake engagement position and a brake disengagement position. In the brake engagement position, the cable is pulled by the lever arm so that the cable moves brake shoes into engagement with corresponding bicycle tire rim to stop tire rotation of the tire. In the brake disengagement position, the cable tension is released and the brake mechanism is disengaged.

Typically, in the brake disengagement position, the lever arm and cable are adjusted to allow the brake shoes to be spaced apart from the tire rim by only a small distance. If the rim of the tire becomes dirty, or covered with mud, as often happens during riding on dirt covered bicycle trails, debris on the rim may contact the disengaged brake shoes creating drag. Further, when going up hill a bicyclist will often walk a bicycle due to the incline of the hill. When going up hill, with either debris on the tire rim or if the tire is slightly out of round, the brake shoes will engage the rim or the debris and create drag. Such drag makes a bicyclist's work much more difficult in the above described situations, and in other situations. It is therefore desirable to eliminate the likelihood of such drag when necessary.

When racing, a bicyclist must move quickly, whether riding or walking a bicycle up hill for a short distance. The drag described above is extremely annoying to a bicyclist in a race, especially since the most common way to change the distance between brake shoes and the tire rim requires the use of tools to adjust either the cable tension, the adjustment of the brake shoes, or the adjustment of the lever arm. The use of a tool or tools in such a manner is undesirable during a race.

SUMMARY OF THE INVENTION

One object of the present invention is to provide a brake lever arm with an adjustment mechanism which allows for adjustment of the distance between brake shoes and a corresponding bicycle tire rim without the use of tools.

Another object of the present invention is to provide a brake lever arm with an adjustment mechanism which allows for rapid adjustment of the distance between brake shoes and a corresponding bicycle tire rim.

In accordance with one embodiment of the present invention, a brake lever mechanism includes a base member formed with a cable guide and the base member having a pivot axis defined at a generally fixed position on the base member, the pivot axis being spaced apart from the cable guide. A lever arm is formed with a handle portion and a support portion, the support portion mounted for pivotal movement on the base member about the pivot axis from a brake disengagement position to a brake engagement position. An adjusting mechanism is mounted on the base member and is spaced apart from the pivot axis. The adjusting mechanism has a pin extending through the base member, an actuation member and a cam member. The cam member and the actuation member are fixed to the pin for rotation about a pin axis defined by the pin. The pin axis and the pivot axis are generally parallel. The cam member has at least three differing cam surfaces each of the cam surfaces configured to define a differing one of the brake disengagement position, the cam member being disposed between the actuation member and an outer surface of the base member for contact with a portion of the lever arm.

Preferably, the actuation member includes a dial member having a plurality of indentations extending radially inward from a radial outer surface thereof, configured to be rotated by a single finger of a bicyclist.

Preferably, the adjusting mechanism further includes an indexing mechanism configured to restrain rotational movement of the cam member.

Preferably, the indexing mechanism includes an aperture formed in the base member, a tab member inserted in the base member and a plurality of recesses formed in the cam member, each of the plurality of recesses positioned for engagement with the tab member in correspondence with the separate brake dis-engagement positions, and the pin is spring biased such that the cam member is urged into engagement with the tab member.

Preferably, the brake lever mechanism further includes a second adjusting mechanism disposed within the support portion of the lever arm, the second adjusting mechanism having a cable contact point defined thereon, the second adjusting mechanism being configured to adjust a position of the cable contact point relative to the pivot axis.

Preferably, the actuation member includes a knob member having three radially extending arms extending from the pin, the three radially extending arms being configured to be rotated by a single finger of a bicyclist.

Preferably, the actuation member includes a lever member having a single lever arm extending radially from the pin, the lever member being configured to be rotated by a single finger of a bicyclist.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 10b is a fragmentary, part cutaway, part elevation side view of the second embodiment of the brake actuation mechanism depicted in FIG. 10a;

DETAILED DESCRIPTION OF THE PREFERRED EMBODIMENTS

Figure 1:
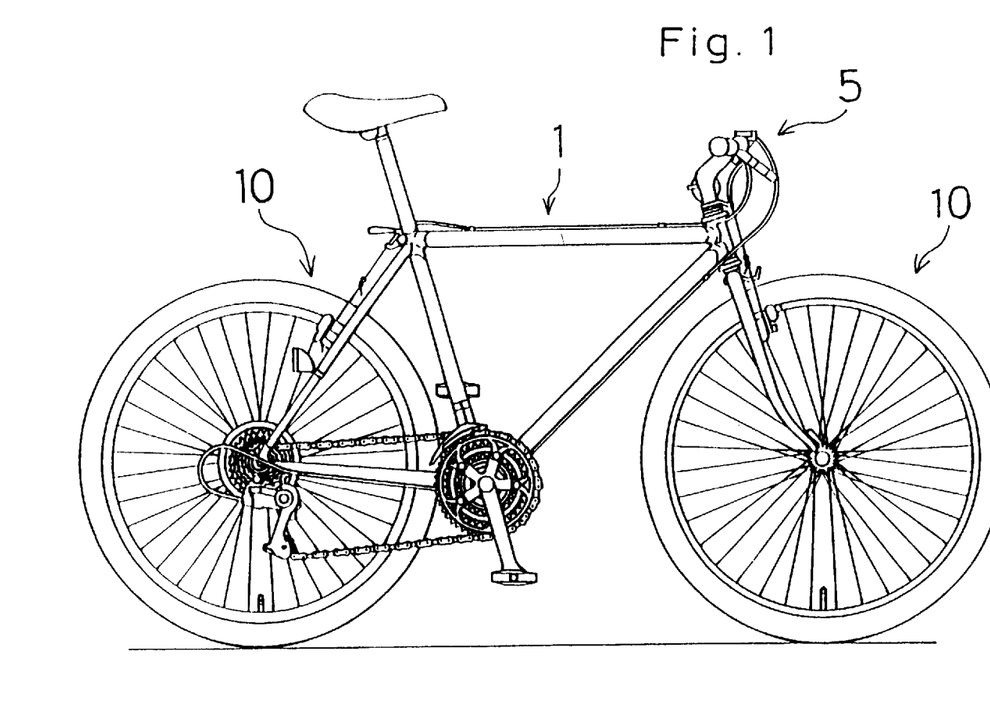
FIG. 1 is a side elevation of a bicycle which employs the present invention.

A bicycle 1 is shown in FIG. 1 is provided with brake actuation mechanisms 5 and a braking mechanisms 10 in accordance with the present invention. The bicycle 1 has both front and rear brake actuation and braking mechanisms that are generally the same. Therefore, description will be provided for one brake actuation mechanism 5 and one braking mechanism 10.

Figure 2A:
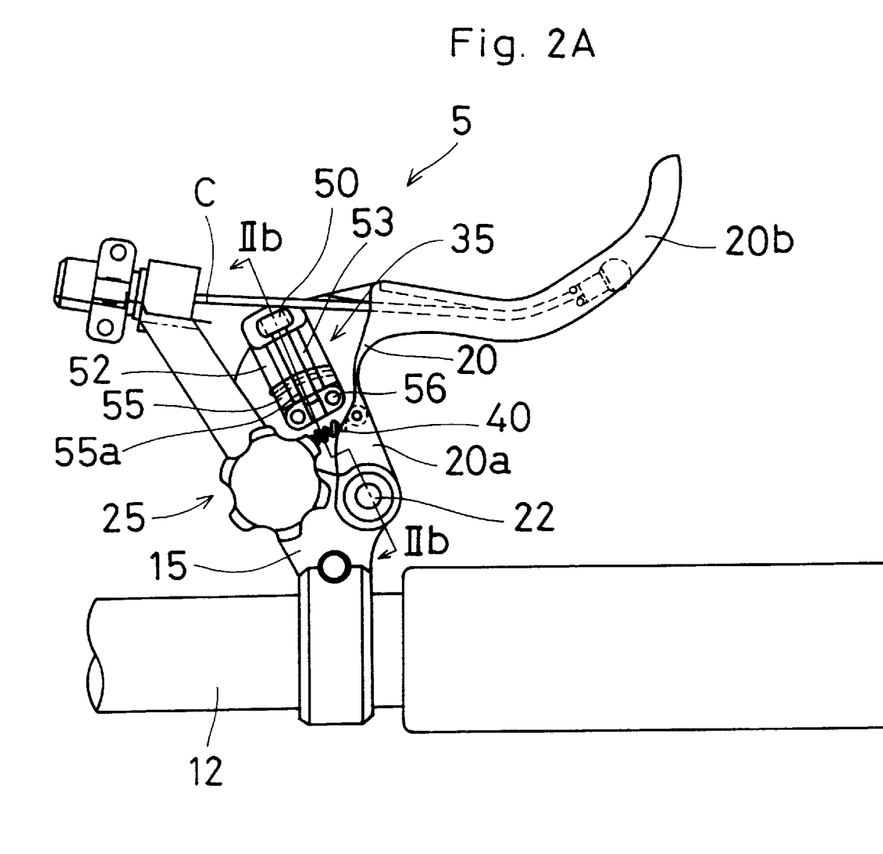
FIG. 2a is a fragmentary, part cutaway side view of a bicycle brake actuation mechanism in accordance with a first embodiment of the present invention having a first adjusting mechanism and a second adjusting mechanism.

As shown in FIG. 2a, the brake actuation mechanism 5 is attached to a handlebar 12 of the bicycle 1. The brake actuation mechanism 5 includes a base member 15 and a lever member 20. The lever member 20 includes a support portion 20a and a lever portion 20b. The support portion 20a is fixed to the base member 15 via a pin 22. The lever member 20 is configured for limited pivotal movement with respect to the base member 15 about the pin 22. The pin 22 defines a pivot point about which the lever member 20 pivots with respect to the base member 15.

The brake actuation mechanism 5 includes a first adjusting mechanism 25 mounted on the base member 15 and a second adjusting mechanism 35 mounted in the lever member 20.

Figure 3:
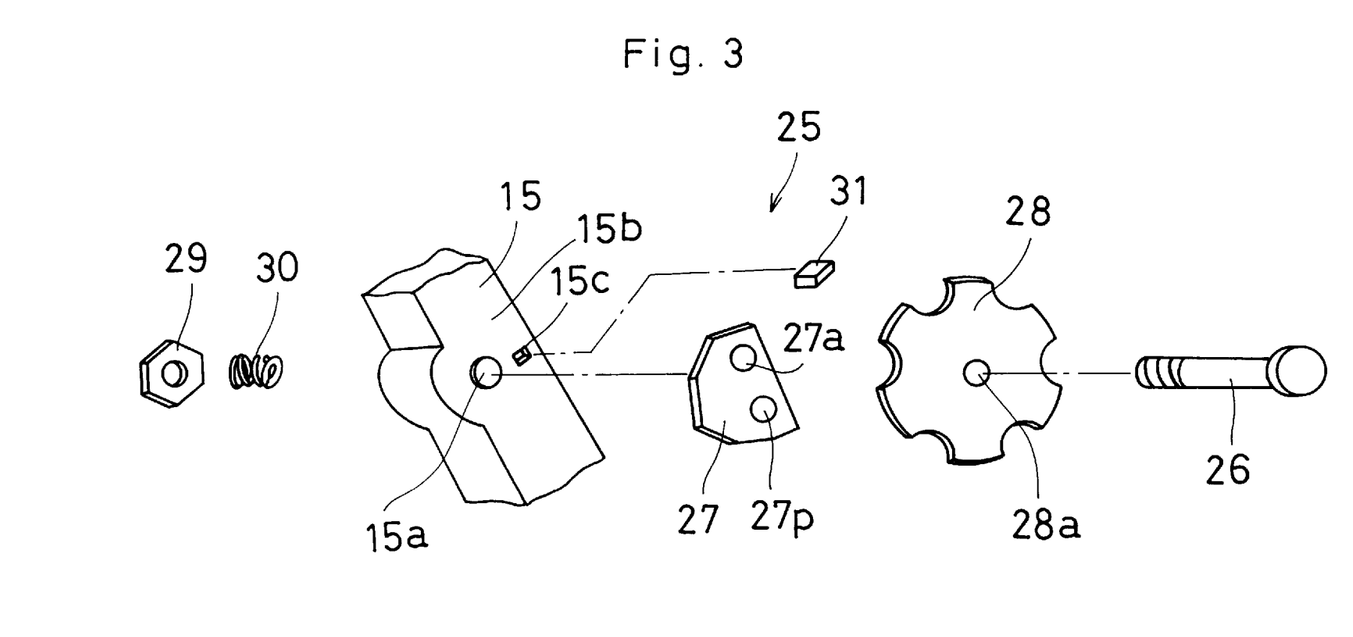
FIG. 3 is an exploded view of the first adjusting mechanism of the bicycle brake actuation mechanism depicted in FIG. 2.

As shown in FIGS. 2 and 3, the first adjusting mechanism 25 includes a pin 26, a cam 27, a dial 28, a nut 29, a spring 30 and an indexing member 31. The base member 15 is formed with an aperture 15a which extends therethrough. The pin 26 is fitted through an aperture 28a in the dial 28, an aperture 27a in the cam 27 and further extends through the aperture 15a. The pin is retained in the aperture 15a via a nut 29 which threads onto the pin 26. The spring 30 is fitted onto the pin 26 prior to installation of the nut 29. When tightened on to the pin 26, the nut 29 and pin 26 are configured such that the distance between the nut 29 and the cam 27 is greater than the thickness of the base member 15. Therefore, the pin 26, along with the cam 27 and dial 28, may move back and forth slightly within the aperture 15a. The limited axial movement of the pin 26 in the aperture 15a is restrained by the nut 29 and the cam 27. The spring 30 is positioned between the nut 29 and the base member 15 and biases the nut 29 away from the base member 15. The biasing effect of the spring 30 urges the cam 27 into engagement with a surface 15b of the base member 15.

The surface 15b is formed with a small depression 15c which is provided with an indexing member 31. The indexing member extends outward from the surface 15b such that it engages the cam 27, as is described in greater detail below.

Figures 4A, 5A:
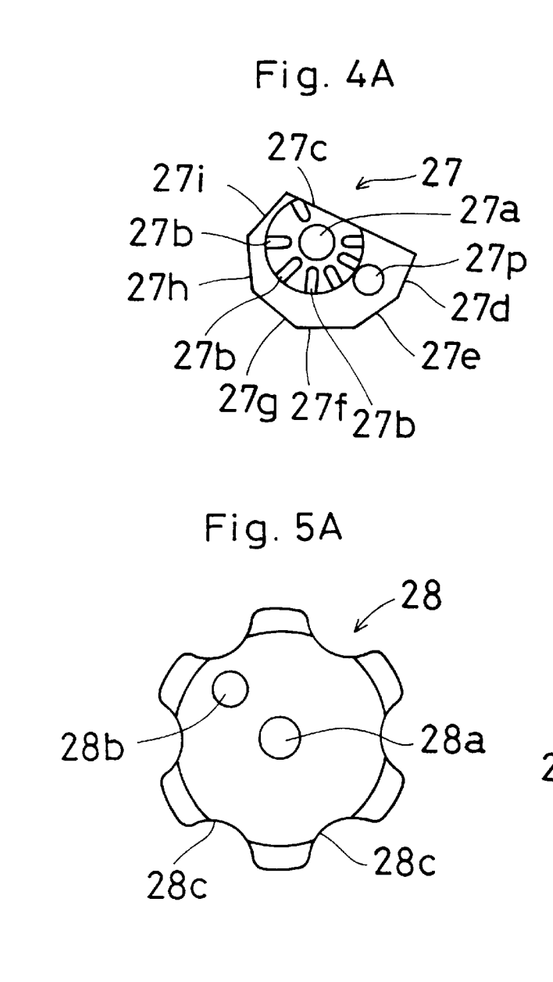
FIGS. 4a, 4b and 4c are reverse, side and front views of a cam member of the first adjusting mechanism depicted in FIG. 3.
FIGS. 5a, 5b and 5c are reverse, side and front views of a dial of the first adjusting mechanism depicted in FIG. 3.
Figures 4B, 4C:
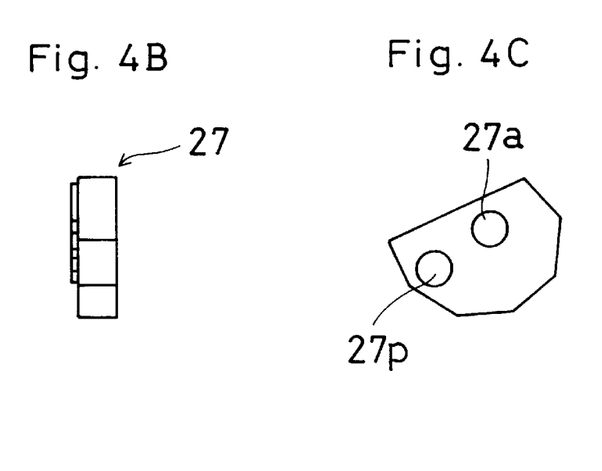

The cam 27 is shown removed from the first adjusting mechanism 25 in FIGS. 4a, 4b and 4c. The cam 27 is formed with a plurality of indexing depressions 27b on a surface thereof, as is shown in FIG. 4a. The indexing depressions 27b are positioned such that, upon rotation of the dial 28, the indexing member 31 may extend into each one of the depressions 27b, one by one, as is described below.

The cam 27 is formed with a plurality of cam surfaces 27c, 27d, 27e, 27f, 27g, 27h and 27i. As is shown in FIG. 4a, each of the cam surfaces is positioned at a different distance from the aperture 27a. The cam 27 is also provided with another aperture 27p.

Figure 5B:
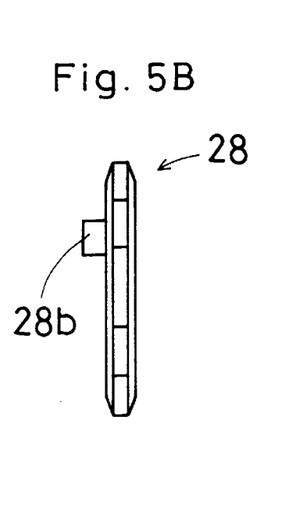
Figure 5C:
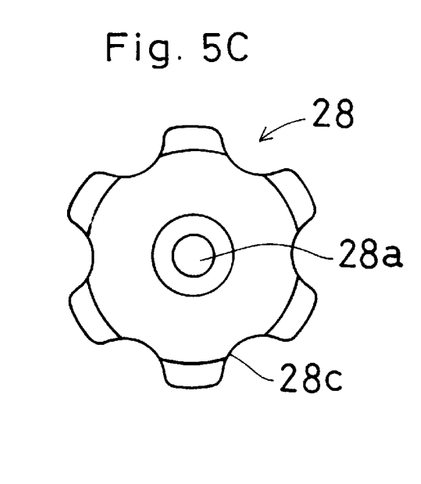

The dial 28 is shown removed from the first adjusting mechanism in FIGS. 5a, 5b and 5c. The dial 28 is formed with a protrusion 28b that is spaced apart and parallel to the aperture 28a. The protrusion 28b is shaped and sized to fit snugly into the aperture 27b of the cam 27. The dial 28 is also formed on its radially outer edge with a plurality of indentations 28c.

The first adjusting mechanism 25 is operated by one or more fingers of a bicyclist. The bicyclist may rotate the dial 28 by engaging the surface of the dial 28 at one of the indentations 28c. The dial 28 is supported on the pin 26 and rotates with the cam 27 via engagement between the protrusion 28a and the aperture 27p. Therefore, selective rotation of the dial 28 allows for selective rotation of the cam 27. The indexing member 31 is configured to extend into any one of the indentations 27b to restrain movement of the cam 27 after a bicyclist rotates the dial 28. The biasing provided by the spring 30 ensures that the indexing member 31 maintains engagement with the cam 27 via one of the depressions 27b. Therefore, after a bicyclist has rotated the dial 28, the cam 27 may be positioned in any of the positions determined by the engagement between the depressions 27b and indexing member 31.

The depressions 27b are positioned to correspond to each of the cam surfaces 27c, 27d, 27e, 27f, 27g, 27h and 27i such that each of the cam surfaces 27c, 27d, 27e, 27f, 27g, 27h and 27i may be positioned to engage a portion of the support portion 20a of the lever member 20. Two such positions of the cam 27 and engagement with the lever member 20 are shown in FIGS. 6 and 7 and described in greater detail below.

As shown in FIG. 2, a spring 40 is disposed between the lever member 20 and the base member 15, being connected to each. The spring 40 is provided to urge a portion of the lever member 20 into engagement with one of the cam surfaces 27c, 27d, 27e, 27f, 27g, 27h or 27i, as is described below with respect to FIGS. 6 and 7.

Figure 6:
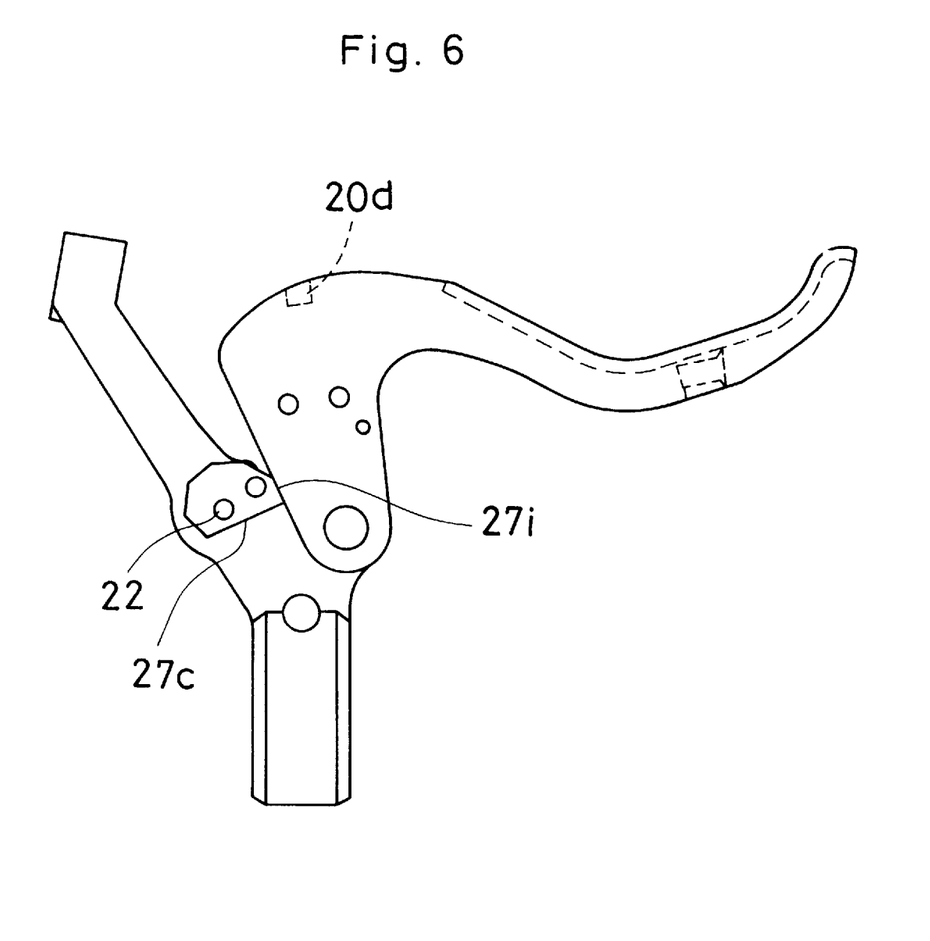
FIG. 6 is a side elevation of the brake actuation mechanism depicted in FIG. 2, with various portions of the brake actuation removed to show engagement between the cam member and a lever member with the cam restricting movement of the lever member to one of several brake disengagement positions.
Figure 7:
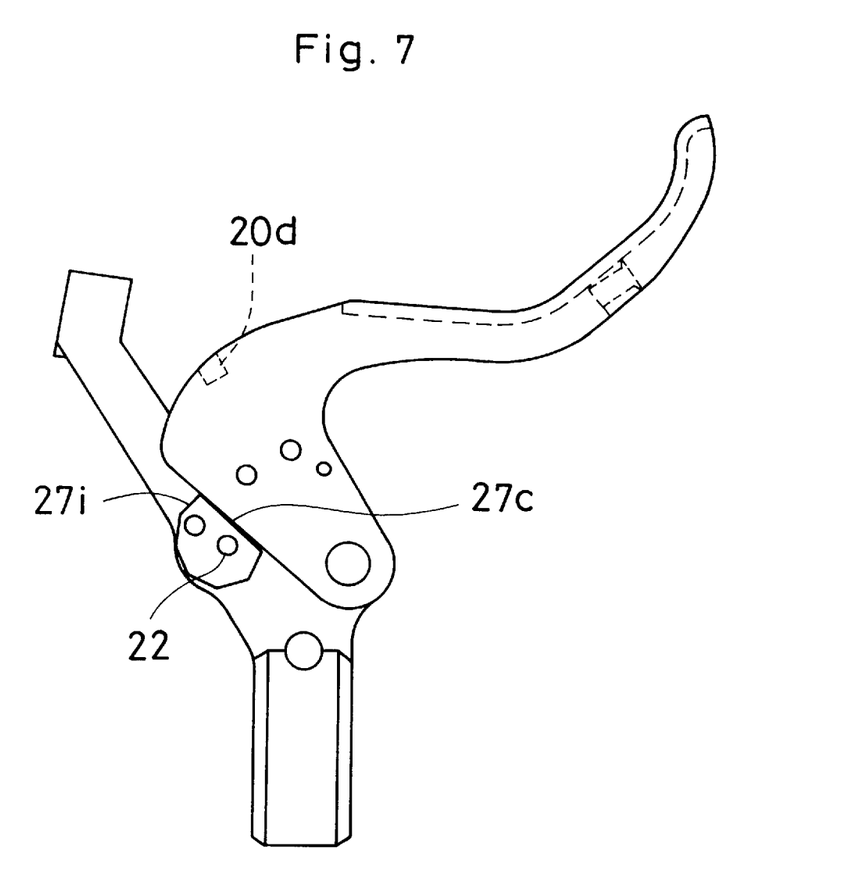
FIG. 7 is a side elevation of the brake actuation mechanism depicted in FIG. 2, similar to FIG. 6, with various portions of the brake actuation removed to show engagement between the cam member and a lever member with the cam restricting movement of the lever member to another brake disengagement position.
Figure 8:
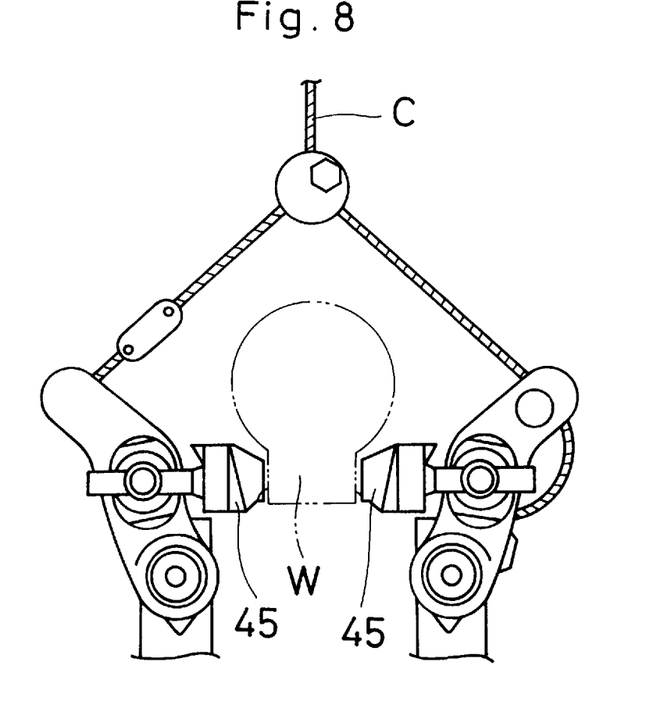
FIG. 8 is a front view of a braking mechanism with brake shoes in a brake disengagement position corresponding to the configuration of the cam and lever member depicted in FIG. 6.

For clarity, the dial 28 of the first adjusting mechanism 25 and other portions of the brake actuation mechanism 5 have been removed in FIGS. 6 and 7. As is shown in FIG. 6, the first adjusting mechanism 25 is positioned such that the cam surface 27i is in contact with a portion of the support portion 20a of the lever member 20. In this position, the cam surface 27i maintains the lever member 20 in a first of a plurality of brake disengagement positions, as shown in FIG. 6. In the position shown in FIG. 6, the lever member 20 keeps tension on the cable C. In turn, the cable C maintains brake shoes 45 in a brake disengagement position such as that depicted in FIG. 8, where the brake shoes 45 are adjusted fairly close to a tire rim W. With the present invention, a bicyclist adjusts the cable C, the brake shoes 45 and the lever mechanism 20 such that the brake shoes 45 are in about the position shown in FIG. 8 with the cam surface 27i in engagement with the lever arm 20. In such an adjustment, brake actuation requires only a minimal movement of the lever arm 20.

Figure 9:
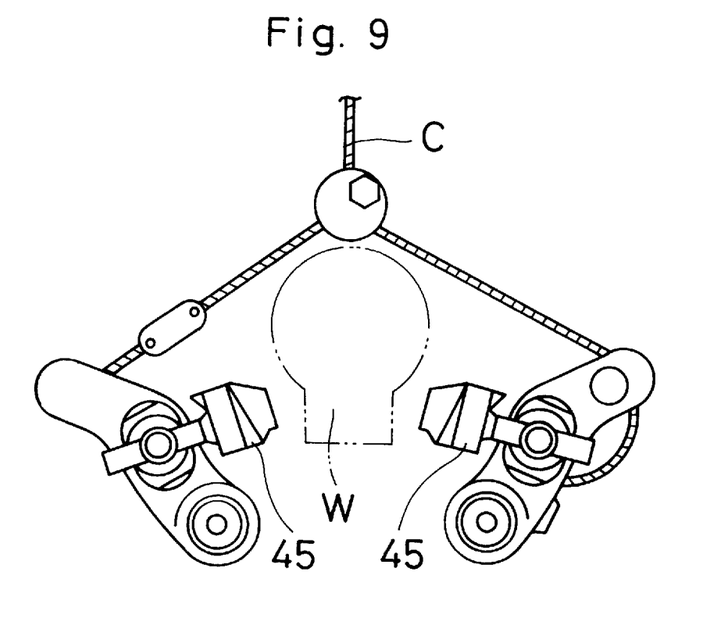
FIG. 9 is a front view of the braking mechanism, similar to FIG. 8, but with the brake shoes in a brake disengagement position corresponding to the configuration of the cam and lever member depicted in FIG. 7.

With the cam 27 adjusted in the position where the cam surface 27c is engaged with the lever arm 20 in a brake disengagement position, the lever arm 20 is positioned as shown in FIG. 7. The lever arm 20 releases some tension on the cable C allowing the brake shoes 45 to move away from the tire rim W, as shown in FIG. 9. With the brake shoes 45 moved away from the tire rim W, the tire rim W may rotate freely without contact with the brake shoes. In the event that debris is layered on surfaces of the tire rim W, there is little possibility of drag being created. Further, should the tire rim W be damaged and become out of round or warped, the release of the tension on the brake cable C due to the contact between the cam surface 27c allows for free rotation of the tire rim W with respect to the brake shoes 45, as shown in FIG. 9.

Each of the cam surfaces 27c, 27d, 27e, 27f, 27g, 27h and 27i is spaced apart from the pin 22 by a different distance and therefore each of the cam surfaces 27c, 27d, 27e, 27f, 27g, 27h and 27i corresponds to differing brake disengagement positions when engaged with the lever arm 20.

Figure 2B:
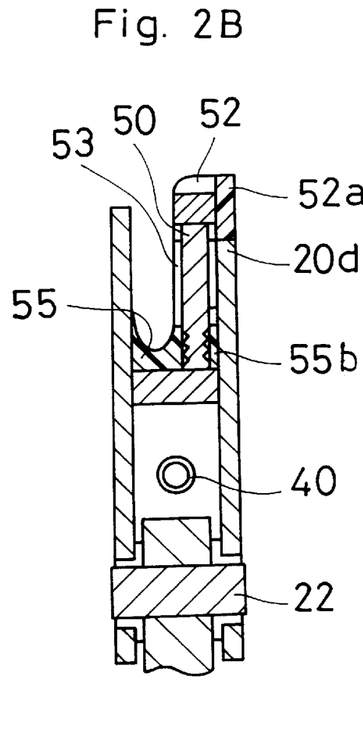
FIG. 2b is a fragmentary rear of the brake actuation mechanism depicted in FIG. 2a, showing details of the second adjusting mechanism taken along the line IIb—IIb, looking in the direction of the arrows, on a slightly enlarged scale.

The second adjusting mechanism 35 will now be described with respect to FIGS. 2a and 2b. The second adjusting mechanism includes an adjusting screw 50, a support member 52 and a cable contact member 55. The support member 52 is fixed to the interior of the support portion 20a of the lever member 20. As is shown in phantom in FIGS. 6 and 7, one portion of the support portion 20a of the lever member 20 is formed with a notch 20d. The support member 52 includes a protrusion 52a which engages the notch 20d fixing the end of the support member 52 to the support portion 20a of the lever member 20. The support member 52 is fixed to the support portion 20a of the lever member 20 at its opposite end by rivets 56. The support member 52 is formed with an elongated recess 53. The cable contact member 55 is formed with a protrusion 55a which extends into the recess 53. The contact member 55 may move along the length of the recess 53. The adjusting screw 50 extends the length of the recess 53 and through a threaded hole 55b formed in the protrusion of the cable contact member 55. Rotation of the adjusting screw 50 may be accomplished by use of a screw driver or similar tool.

Figure 10A:
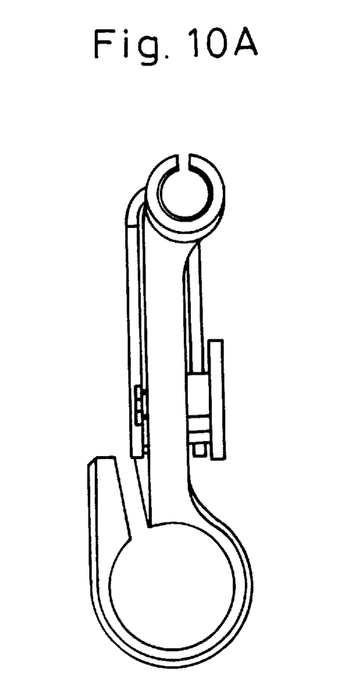
FIG. 10a is a front view of a brake actuation mechanism in accordance with a second embodiment of the present invention.
Figure 10B:
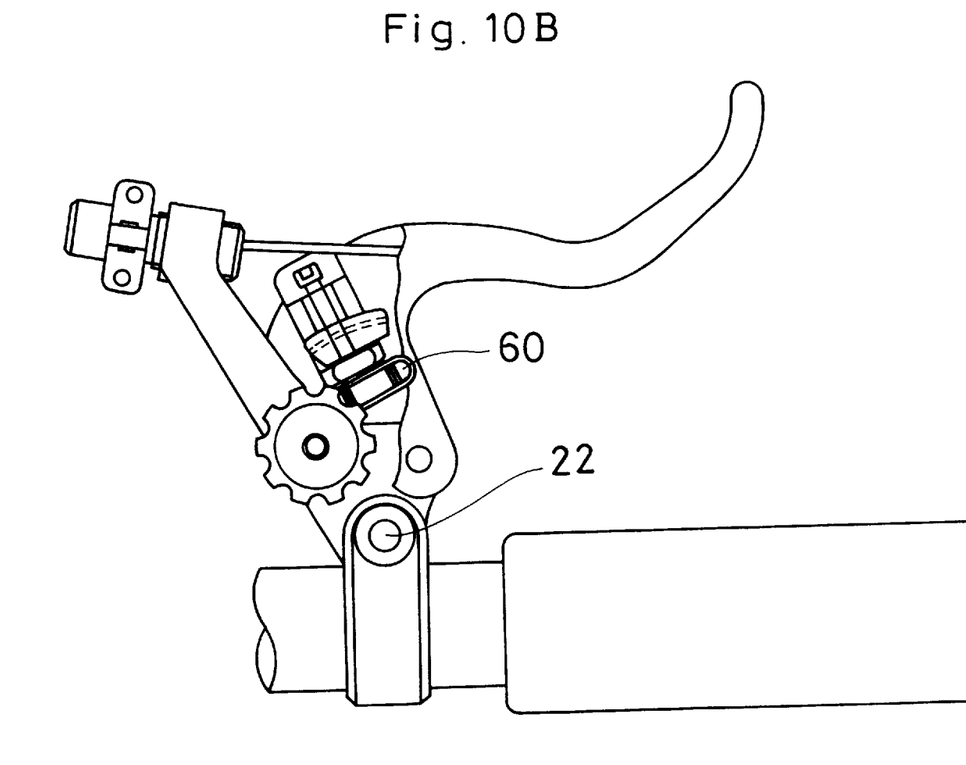

However, in an alternate embodiment of the present invention, shown in FIGS. 10a and 10b, the adjusting screw 50 may be adjusted via a wheel 60, where the adjusting screw 50 extends through a hole formed in wheel 60 and the adjusting screw 50 is fixed to the wheel 60 for rotation therewith.

The second adjusting mechanism 35 provides a means for adjusting the position of the cable contact member 55 with respect to the pivot pin 22. The second adjusting mechanism 35 permits changes in the amount of force required from a bicyclist's fingers to move the lever member 20 to engage the brakes. The change in the required force is effected by movement of the cable contact member 55 with respect to the pivot pin 22.

The present invention is not limited to the embodiments described above. For instance, it should be understood that the spring 30 could also be a flexible conical shaped spring or other similar biasing means. Further, the spring 30 could be eliminated and the indexing member 31 be replaced with a spring biased ball disposed in the base member 15 which engages the depressions 27b. Further, base member 15 could be provided with a recess and the spring 30 and the nut 29 on the pin 26 could be disposed within the recess.

Figure 11:
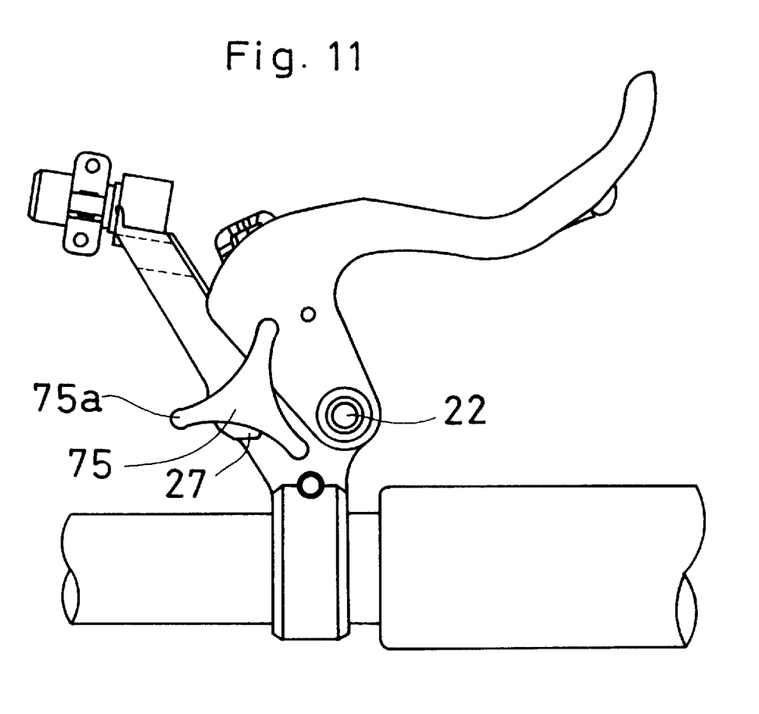
FIG. 11 is a fragmentary side view of a third embodiment of the brake actuation mechanism.

As well, the dial member 28 may have alternate shapes. For instance, in a third embodiment, as shown in FIG. 11, the dial member 28 may be replaced with a knob 75 having three radially extending portions 75a. The lever portions 75a provide a convenient means for a bicyclist to adjust the brake disengagement position of the lever member 20 using a single finger.

Figure 12:
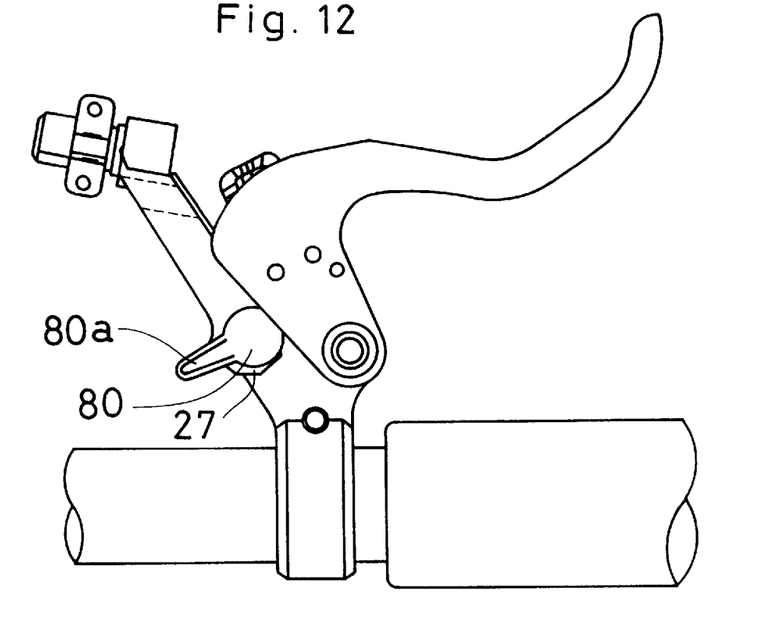
FIG. 12 is a fragmentary side view of a fourth embodiment of the brake actuation mechanism.

In a fourth embodiment shown in FIG. 12, the dial member 28 may be replaced with a lever member 80, having a single lever 80a. It should be appreciated that any of a variety of shapes and configurations may be employed as a dial member. Further, the number and size of the cam surfaces of the cam 27 may be any of a variety of sizes and shapes and need not be limited to the size, number or shape described above.

One distinct advantage of the present invention, is that the brake disengagement position of the lever portion 20b (and the corresponding position of the brake shoes 45) can be adjusted without the use of any tools. Adjustment only requires a simple movement of a bicyclist's finger.

The first adjusting mechanism 25 can be adjusted while a bicyclist is riding the bicycle 1. In order to manipulate the first adjusting mechanism 25, a bicyclist must slightly move the lever portion 20b toward the brake engagement position to disengage the support portion 20a from the cam 27, and then turn the dial 28 such that a desired cam surface is in position. It is not necessary to get off the bicycle or stop the bicycle to make an adjustment to the first adjusting mechanism 25.

Co-pending application Ser. No. 08/753,238 filed Nov. 25, 1996 and U.S. Pat. No. 08/598,578 filed Feb. 12, 1996 are incorporated herein by reference with regard to description of the second adjusting mechanism 35.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A brake lever mechanism comprising:
   a base member (15) formed with a cable guide and said base member having a pivot axis (22) defined at a generally fixed position on said base member, said pivot axis being spaced apart from said cable guide;
   a lever arm (20) formed with a handle portion (20b) and a support portion (20a), said support portion mounted for pivotal movement on said base member about said pivot axis from a brake dis-engagement position to a brake engagement position;

an adjusting mechanism (25) mounted on said base member and being spaced apart from said pivot axis, said adjusting mechanism having a pin (26) extending through said base member, an actuation member (28) and a cam member (27), said cam member and said actuation member being fixed to said pin for rotation about a pin axis defined by said pin, said pin axis and said pivot axis being generally parallel, said cam member having at least three differing cam surfaces each of said cam surfaces configured to define a differing one of said brake dis-engagement position, said cam member being disposed adjacent to an outer surface of said base member outside of said base member, said actuation member being adjacent to said cam member outside of said base member and being spaced apart from said base member with said cam member being disposed between said actuation member and said outer surface of said base member for contact with a portion of said lever arm, wherein said actuation member is configured such that said cam member and said actuation member may be rotated in response to contact movement by a single finger of a band of a bicyclist riding a bicycle having the brake lever mechanism attached thereto.

2. The brake lever mechanism as in claim 1, wherein said actuation member comprises a dial member (28) having a plurality of indentations extending radially inward from a radial outer surface thereof, said dial member being configured to be rotated by a single finger of a bicyclist.

3. The brake lever mechanism as in claim 1, wherein said adjusting mechanism further comprises an indexing mechanism (31 & 27b), said indexing mechanism being configured to restrain rotational movement of said cam member.

4. The brake lever mechanism as in claim 3, wherein said indexing mechanism comprises an aperture formed in said base member, a tab member (31) inserted in said base member and a plurality of recesses (27b) formed in said cam member, each of said plurality of recesses positioned for engagement with said tab member in correspondence with said separate brake dis-engagement positions, and said pin is spring biased such that said cam member is urged into engagement with said tab member.

5. The brake lever mechanism as in claim 1, further comprises a second adjusting mechanism (35) disposed within said support portion of said lever arm, said second adjusting mechanism having a cable contact point defined thereon, said second adjusting mechanism being configured to adjust a position of said cable contact point relative to said pivot axis.

6. The brake lever mechanism as in claim 1, wherein said actuation member comprises a knob member having a three radially extending arms extending from said pin, said three radially extending arms being configured to be rotated by a single finger of a bicyclist.

7. The brake lever mechanism as in claim 1, wherein said actuation member comprises a lever member having a single lever arm extending radially from said pin, said lever member being configured to be rotated by a single finger of a bicyclist.

8. A brake lever mechanism comprising:

a base member (15) formed with a cable guide and said base member having a pivot axis (22) defined at a generally fixed position on said base member, said pivot axis being spaced apart form said cable guide;

a lever arm (20) formed with a handle portion (20b) and a support portion (20a), said support portion mounted for pivotal movement on said base member about said pivot axis from a brake dis-engagement position to a brake engagement position; and an adjusting mechanism (25) mounted on said base member and being spaced apart form said pivot axis, said adjusting mechanism having a pin (26) extending through said base member, an actuation member (28) and a cam member (27), said cam member and said actuation member being fixed to said pin for rotation about a pin axis defined by said pin, said pin axis and said pivot axis being generally parallel, said cam member having at least three differing cam surfaces each of said cam surfaces configured to define a differing one of said brake dis engagement position, said cam member being disposed between said actuation member and an outer surface of said base member for contact with a portion of said lever arm, said adjusting mechanism further including an indexing mechanism defined by;

an aperture formed in said base member, a tab member (31) inserted in said base member and a plurality of recesses (27b) formed in said cam member, each of said plurality of recesses positioned for engagement with said tab member in correspondence with said separate brake dis-engagement positions, and said pin is spring biased such that said cam member is urged into engagement with said tab member, said indexing mechanism being configured to restrain rotational movement of said cam member.

9. The brake lever mechanism as to claim 8, wherein said actuation member comprises a dial member (28) having a plurality of indentations extending radially inward from a radial outer surface thereof, said dial member being configured to be rotated by a single finger of a bicyclist.

10. The brake lever mechanism as in claim 8, further comprises a second adjusting mechanism (35) disposed within said support portion of said lever arm, said second adjusting mechanism having a cable contact point defined theron, said second adjusting mechanism being configured to adjust a position of said cable contact point relative to said pivot axis.

11. The brake lever mechanism as in claim 8, wherein said actuation member comprises a knob member having a three radially extending arms extending from said pin, said three radially extending arms being configured to be rotated by a single finger of a bicyclist.

12. The brake lever mechanism as to claim 8, wherein said actuation member comprises a lever member having a single lever arm extending radially from said pin, said lever member being configured to be rotated by a single finger of a bicyclist.

* * * * *